(12) United States Patent
Gonidec et al.

(10) Patent No.: US 11,492,128 B2
(45) Date of Patent: Nov. 8, 2022

(54) METHOD FOR SUPPLYING ELECTRIC POWER TO AN ULTRASONIC NACELLE DE-ICING AND ANTI-ICING

(71) Applicant: Safran Nacelles, Gonfreville l'Orcher (FR)

(72) Inventors: Patrick Gonidec, Moissy Cramayel (FR); Jean-Paul Rami, Gonfreville l'Orcher (FR); Hakim Maalioune, Moissy Cramayel (FR); Rémi Billard, Valbonne (FR); Vincent Rigolet, Valbonne (FR); Jean-Denis Sauzade, Valbonne (FR)

(73) Assignee: Safran Nacelles, Gonfreville l'Orcher (FR)

(*) Notice: Subject to any disclaimer, the term of this patent is extended or adjusted under 35 U.S.C. 154(b) by 69 days.

(21) Appl. No.: 17/025,051

(22) Filed: Sep. 18, 2020

(65) Prior Publication Data

US 2021/0078711 A1    Mar. 18, 2021

Related U.S. Application Data

(63) Continuation of application No. PCT/FR2019/050607, filed on Mar. 18, 2019.

(30) Foreign Application Priority Data

Mar. 19, 2018 (FR) .................................. 18/52325

(51) Int. Cl.
*B64D 15/16* (2006.01)
*B64D 15/22* (2006.01)

(52) U.S. Cl.
CPC .......... *B64D 15/163* (2013.01); *B64D 15/22* (2013.01)

(58) Field of Classification Search
CPC ....... B64D 15/20; B64D 15/22; B64D 15/163
See application file for complete search history.

(56) References Cited

U.S. PATENT DOCUMENTS 4,176,524 A * 12/1979 Kamiyama ............. F25D 21/02
                                                       310/324
4,470,123 A *  9/1984 Magenheim .......... B64D 15/20
                                                       702/172

(Continued)

FOREIGN PATENT DOCUMENTS

FR       2990927 A1 * 11/2013 ........... B64D 15/163
WO  WO-9628726 A1 *  9/1996 ............. G01N 29/09
WO       2014040819     3/2014

OTHER PUBLICATIONS

International Search Report for International Application PCT/FR2019/050607, dated Jul. 17, 2019.

*Primary Examiner* — Brian M O'Hara
*Assistant Examiner* — Michael B. Kreiner
(74) *Attorney, Agent, or Firm* — Burris Law, PLLC

(57) ABSTRACT

A method for de-icing or anti-icing an aircraft portion having at least one piezoelectric element fastened on the inner face of the aircraft portion includes, during a design phase of the aircraft portion, placing the piezoelectric element on an area of the aircraft portion to determine frequencies of resonance and increased dynamic coupling, and during the de-icing or anti-icing of the aircraft portion, the same piezoelectric element is excited according to the natural frequencies of the area.

10 Claims, 1 Drawing Sheet

(56) References Cited

U.S. PATENT DOCUMENTS

| | | | | |
|---|---|---|---|---|
| 4,545,553 | A | * | 10/1985 | Finke .................. B64D 15/163 244/134 D |
| 4,732,351 | A | * | 3/1988 | Bird .................... B64D 15/163 244/134 D |
| 4,775,118 | A | * | 10/1988 | Daniels ................ B64D 15/20 244/134 D |
| 4,833,660 | A | * | 5/1989 | Deom .................. G01B 17/025 367/157 |
| 5,191,791 | A | * | 3/1993 | Gerardi ................. B64D 15/16 73/178 R |
| 5,507,183 | A | * | 4/1996 | Larue ................... B64D 15/20 340/582 |
| 2008/0054762 | A1 | | 3/2008 | Ludwiczak |
| 2009/0224104 | A1 | * | 9/2009 | Tenebre ............... B64D 15/163 244/134 R |
| 2010/0031972 | A1 | | 2/2010 | Royer, Jr. et al. |
| 2013/0032671 | A1 | * | 2/2013 | Giles ................... B64D 15/163 244/134 R |
| 2013/0327756 | A1 | * | 12/2013 | Clemen, Jr ........... B64D 15/20 219/202 |
| 2016/0023772 | A1 | * | 1/2016 | Borigo ................. B64D 15/163 134/1 |

* cited by examiner

METHOD FOR SUPPLYING ELECTRIC POWER TO AN ULTRASONIC NACELLE DE-ICING AND ANTI-ICING

CROSS-REFERENCE TO RELATED APPLICATIONS

This application is a continuation of International Application No. PCT/FR2019/050607, filed on Mar. 18, 2019, which claims priority to and the benefit of FR 18/52325 filed on Mar. 19, 2018. The disclosures of the above applications are incorporated herein by reference.

FIELD

The present disclosure relates to a method and a system for de-icing or anti-icing an aircraft portion.

BACKGROUND

The statements in this section merely provide background information related to the present disclosure and may not constitute prior art.

The formation of frost on aircraft portions, such as the leading edges of the wings or the air inlet lips of turbojet engine nacelles, is a recurring issue in the field of aeronautics.

Indeed, the appearance of frost on these aircraft portions not only increases the weight of the latter, but also is likely to lead to the formation of blocks of ice which can detach and impact sensitive portions of the aircraft, such as the blades of a turbojet engine fan.

For this reason, much work has been performed in the prior art, in order to set up systems allowing to effectively combat the formation of frost (anti-icing), and to remove the frost layer once it has appeared (de-icing), for example, in U.S. Patent Publication Nos. 2013/0032671 A1 and 2008/0054762 A1.

Some systems of the prior art are pneumatic: hot air is taken from the motor of the aircraft, and this hot air licks the inner faces of the walls to be de-iced, so as to melt the frost which is formed on the outer faces of the walls thereof.

This pneumatic system, although quite efficient, has the drawback of requiring a specific piping circuit, and of taking a significant portion of energy from the motors, thus penalizing the efficiency of the latter.

Moreover, there are systems in the prior art allowing vibrating the walls on which the frost is formed: this vibration is obtained by means of piezoelectric elements fastened on the inner faces of these walls; sending electrical excitation currents in these elements allows vibrating them, and thus causing a mechanical peeling off of the frost layer being formed on the outer face of the wall.

An example of this technology is proposed by the prior document U.S. Patent Publication No. 2010/0031972, which describes a method for controlling piezoelectric elements allowing adding the amplitudes of the vibrations produced by these elements at each point of the wall to be de-iced, and thus optimizing the power consumption of these elements.

SUMMARY

This section provides a general summary of the disclosure and is not a comprehensive disclosure of its full scope or all of its features.

The present disclosure aims at improving this latter technology.

In one form, the present disclosure provides a method for de-icing or anti-icing an aircraft portion by at least one of a first piezoelectric element fastened on the inner face of the aircraft portion and a second piezoelectric element located in the vicinity of the first piezoelectric element. The method includes, during the design phase of the aircraft portion, placing the first piezoelectric element on an area of the aircraft portion in order to determine frequencies of resonance and improved dynamic coupling. The method further includes, during the de-icing or anti-icing of the aircraft portion, exciting the first piezoelectric element according to the natural frequencies of the area of the aircraft portion.

Under the method according to the present disclosure, which includes a prior step of placing each piezoelectric element on an area of the aircraft portion to be de-iced which allows an improved electrotechnical coupling, then a step of exciting this piezoelectric element at frequencies allowing resonating this area, a maximum vibration amplitude of this area is obtained, thus allowing breaking then peeling off the frost layer.

Other optional features of the method according to the present disclosure may include any of the following.

In a variation, the impedance of the excitation circuit of said piezoelectric element is matched with that of this element.

In another variation, the operation of the first piezoelectric element is checked by measuring the impedance first piezoelectric element and comparing it with the nominal impedance of the first piezoelectric element, by analyzing an impedance drift, or a combination thereof.

In a further variation, the presence of frost is identified by successive measurements of the dynamic damping of the first piezoelectric element by a spectrum analyzer that scans the frequency and the quality of the electro-mechanical coupling of the first piezoelectric element with the aircraft portion.

In an even further variation, exciting the first piezoelectric element in several frequency ranges, including at least one frequency range between 10 kHz and 200 kHz, simultaneously or successively, depending on the result of the step of searching for frequencies of the resonance and improved dynamic coupling during the design phase.

In yet another variation, the first piezoelectric element is excited intermittently, either with a timing or from a measurement of the variation in impedance of the first piezoelectric element.

In another variation, a second piezoelectric element located in the vicinity of said first piezoelectric element is provided, and if the electrical level detected by said second piezoelectric element is close to (i.e., within a defined range) the excitation level of said first piezoelectric element, it is deduced that the de-icing is operational; otherwise, said second piezoelectric element is also excited, to add its action to that of said first piezoelectric element.

In a variation, the excitation of a set of piezoelectric elements is switched to another set, depending on the frost thickness to inhibit de-icing areas where the frost thickness is less than a thickness threshold.

The present disclosure also relates to a system for de-icing or anti-icing an aircraft portion, including at least one piezoelectric element fastened inside the aircraft portion and a second piezoelectric element located in the vicinity of the first piezoelectric element, and an excitation circuit including a signal generator, an amplifier, an analyzer to analyze the electrical spectrum produced by the first piezoelectric element, a natural frequency detector, a memory comparator and a frequency setpoint generator.

In variations, other optional features of this system may include the following.

Variations where said excitation circuit includes a battery or a super capacitor.

Variations where the excitation circuit includes means for matching impedance with the impedance of the first piezoelectric element.

Variations where the system includes the first piezoelectric element and second piezoelectric element, and the excitation circuit is configured to multiplex power and monitor the first piezoelectric element and the second piezoelectric element.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
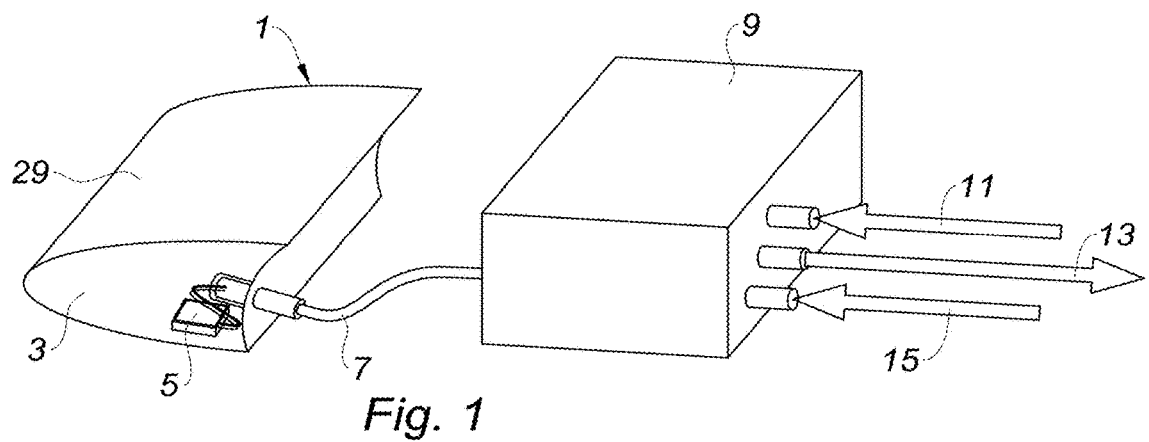
FIG. 1 is a schematic view of an air inlet lip portion of an aircraft turbojet engine nacelle, equipped with a piezoelectric element connected to a control box according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

By referring to FIG. 1, an air inlet lip 1 (also referred to herein as a carrier structure) of an aircraft turbojet engine nacelle is schematically represented, on the inner face 3 thereof a piezoelectric element 5, connected by an electrical wiring 7 to a control box 9, is glued.

This control box can receive orders 11 from the pilot of the aircraft, send 13 information to this pilot, and be electrically powered 15 by a circuit installed on board the plane.

Figure 2:
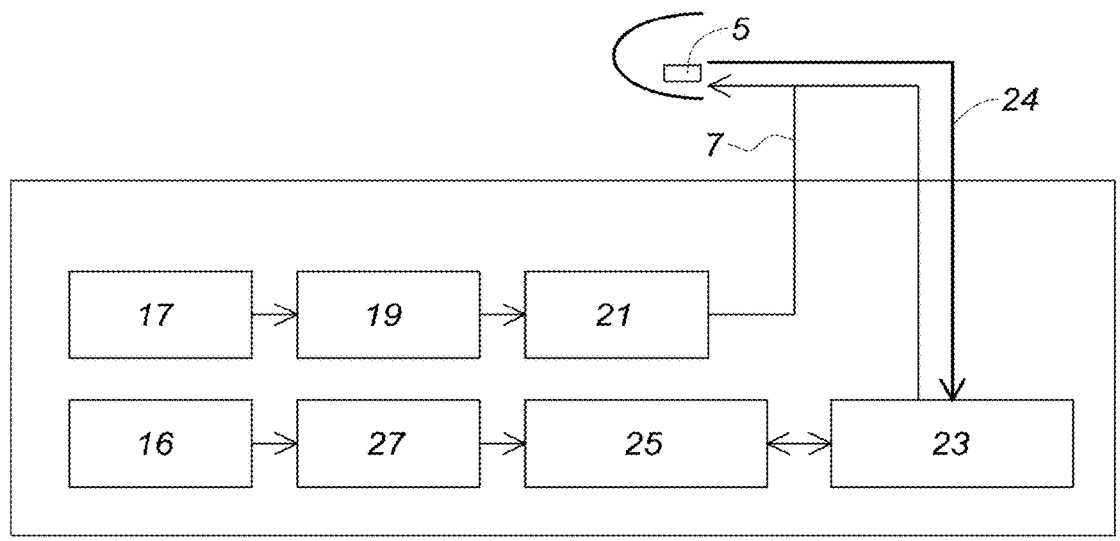
FIG. 2 is a diagram of the architecture of control of the piezoelectric element of FIG. 1.

More specifically, the architecture of control of the piezoelectric element 5 can be visualized in FIG. 2.

This architecture comprises a frequency setpoint generator 16, an electrical frequency generator 17, an amplifier 19 of these signals, a variable inductance 21 allowing matching the impedance of the electrical excitation with that of the piezoelectric element 5.

The members 16, 17, 19, 21 allow generating a sinusoidal electrical excitation of the piezoelectric element 5 through the excitation circuit 7.

A frequency spectrum analyzer 23 allows measuring, through a feedback circuit 24, the effective vibration frequencies of the piezoelectric element 5.

An electronic unit 25 (also referred to herein as a natural frequency detector) allows detecting the vibration amplitude peaks of the piezoelectric element 5, thus indicating that the wall of the air inlet 1 is vibrating according to any of these natural frequencies.

A memory comparator 27 is interposed between the natural frequency detector 25 and the setpoint generator 16.

The principle of operation of the present disclosure is as follows.

During the design of the air inlet 1, a plurality of piezoelectric elements such as the piezoelectric element 5 are placed on the inner face 3 of this air inlet 1, at places allowing carrying out an electrotechnical coupling (also referred to herein as a dynamic coupling), that is to say at places allowing increasing the vibration amplitude of the inner face 3 under the effect of the vibration of the piezoelectric elements 5 for a given excitation current.

Subsequently, in operation, at the start of a de-icing or anti-icing sequence, one starts by checking the integrity of the piezoelectric elements by measuring their impedance, and by comparing it to a nominal value or to a previously recorded value: any significant deviation relative to nominal/previously recorded value (e.g., impedance drift) may reveal an issue with the gluing or integrity of the concerned piezoelectric element.

Electrical pulses are sent to each piezoelectric element 5 by means of the signal generator 17, and the damping of these signals is examined by means of the spectrum analyzer 23. In this manner, frost may be identified by successive measurements of the dynamic damping of a piezoelectric element 5 by the spectrum analyzer 23 by scanning the frequency and quality of the electro-mechanical coupling of the piezoelectric element 5 and a portion of the aircraft.

A gray or polyfrequency noise can advantageously be used to cover a frequency band containing natural frequencies of the carrier structure 1.

When a significant damping is detected, it means that frost is forming on the outer face 29 of the air inlet 1.

An excitation current of each piezoelectric element 5 is then sent, by means of the signal generator 17 and the associated amplifier 19 thereof, according to frequencies set by the setpoint generator 16.

Preferably, these excitation frequencies comprise, on the one hand, a range of low frequencies, typically around 40 kHz, and on the other hand, a range of high frequencies, typically around 200 kHz. In a variation, the range of low frequencies may be around 10 kHz.

Depending on the signals collected by the spectrum analyzer 23, these excitation frequencies are varied until obtaining a resonance phenomenon of the piezoelectric element 5, detected by the natural frequency detection member 25.

This resonance of each piezoelectric element 5 allows obtaining a maximum vibration amplitude of the concerned area of the air inlet lip 1, and thus a fractionation, then a peel off of the frost layer formed on the outer face 29 of this air inlet lip.

It should be noted that the low frequency range allows carrying out the operation of fracturing the ice, and that the high frequency range allows carrying out the operation of peeling off this ice layer.

It should be noted that the excitation currents in the two aforementioned frequency ranges can be sent simultaneously or alternately to the piezoelectric elements.

In one form, it is possible to provide a fixed time delay or a function of the measurement of the variation in impedance of the piezoelectric elements, allowing them to be excited only when the frost layer reaches a sufficient thickness (i.e., thickness threshold), typically between 0.5 and 0.6 mm:

indeed, it has been noted empirically that de-icing only reached its full effectiveness when such a thickness was reached. In this manner, the measurement of the variation may be taken intermittently.

A significant improvement can be made by providing that the electronic circuit for exciting the piezoelectric elements 5 comprises means for matching the impedance with that of the piezoelectric elements thereof.

Indeed, these piezoelectric elements have a behavior similar to that of capacitors in the electrical excitation circuit: this induces a significant reactive power and a bad cos φ, leading to a loss of energy.

The impedance matching means can comprise a fixed inductance (coil) or else, in a more sophisticated manner, an inductance which is variable depending on the excitation frequency: the latter solution could be suitable in particular for resorbing the very thick frost layers strongly disturbing the resonance frequencies of the wall to be de-iced.

As can be understood in the light of the above, the present disclosure allows improving the amplitude of the vibrations of the area to be de-iced, for a given electrical excitation: this allows expelling the frost with a lower consumption of electrical energy, by a purely dynamic process.

In practice, it is observed that there is practically no passage of the frost in the liquid state, such that there is practically no electrical energy dissipated in heat: the disappearance of the frost is caused almost exclusively by setting the wall on which it was formed into vibratory movement.

Figure 3:
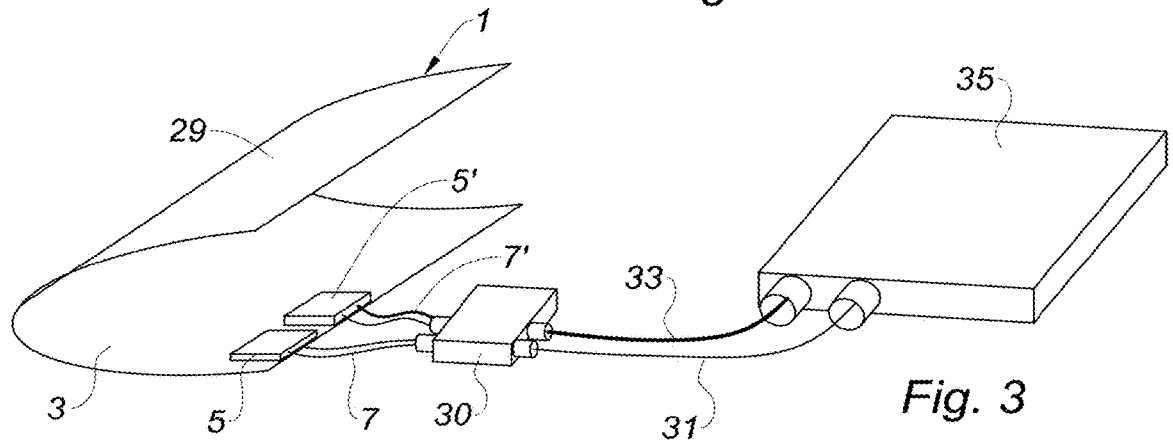
FIG. 3 is a view similar to that of FIG. 1, of a variant of the present disclosure comprising a passive piezoelectric element disposed next to an active piezoelectric element.

According to a variant represented in FIG. 3, it is provided that next to each active piezoelectric element 5, that is to say biased by electrical excitations in accordance with the above, there is a passive piezoelectric element 5', these two piezoelectric elements being respectively connected by electric cables 7 and 7' to a comparator 30, itself connected respectively by electric excitation cable 31 and return cable 33 to a control box 35.

In this particular configuration, the passive piezoelectric element 5' measures the effective vibrations caused by the active piezoelectric element 5, and detects a possible malfunction. That is, when an electrical level detected by the passive piezoelectric element is within a defined range (i.e., close to) of an excitation level of the active piezoelectric element, the de-icing process is determined to be operational. On the other hand, in response to the electrical level of the passive piezoelectric being outside the defined range of the excitation level of the first piezoelectric element, the passive piezoelectric element is excited to become an active piezoelectric element 5' in addition to the other piezoelectric element 5.

In the case of such a malfunction, an electrical excitation current can then be sent into the piezoelectric element 5', so as to transform it into an active element, and to add its vibratory contribution to that of the piezoelectric element 5.

In a more economical configuration, it can be considered that there are not, on the one hand, active piezoelectric elements and on the other hand passive piezoelectric elements, but that all piezoelectric elements are matched (that is to say operate in pairs) each piezoelectric element of a pair can operate alternately as an active or a passive element.

According to a power saving logic, it should be noted that it is possible to consider a multiplexing by areas of the piezoelectric elements, allowing exciting only the piezoelectric elements located in an area where the frost layer has reached a sufficient thickness (see above: typically between 0.5 and 0.6 mm) in order to increase the electrical energy consumption.

This strategy allows carrying out an actual power saving by increasing the ratio of frost reforming time to de-icing time.

Still according to an electric power saving logic, it is also possible to consider an electrical circuit comprising a battery or a super capacitor, recharged during the time of reconstitution of the frost layer, and discharged during the implementation of the defrost electrical excitation, thus allowing increasing the peak voltage and therefore increasing the deflections of the piezoelectric elements.

Of course, the present disclosure is in no way limited to the forms which are described and represented.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for de-icing or anti-icing an aircraft portion by at least one of a first piezoelectric element fastened on an inner face of the aircraft portion and a second piezoelectric element located in a vicinity of the first piezoelectric element, the method comprising:
    during a design phase of the aircraft portion, placing the first piezoelectric element on an area of the aircraft portion to determine frequencies of resonance and dynamic coupling;
    during the de-icing or anti-icing of the aircraft portion, exciting the first piezoelectric element according to natural frequencies of the area of the aircraft portion;
    determining that the de-icing is operational when an electrical level detected by the second piezoelectric element is within a defined range of an excitation level of the first piezoelectric element; and
    exciting the second piezoelectric element in addition to the first piezoelectric element in response to the electrical level of the second piezoelectric being outside the defined range of the excitation level of the first piezoelectric element.

2. The method according to claim 1, wherein the operation of the first piezoelectric element is checked by measuring impedance of the first piezoelectric element and comparing it with a nominal impedance of the first piezoelectric element, by analyzing an impedance drift, or a combination thereof.

3. The method according to claim 1 further comprising:
    identifying presence of frost based on successive measurements of dynamic damping of the first piezoelectric element by a spectrum analyzer that scans the frequency and the quality of the electro-mechanical coupling of the first piezoelectric element with the aircraft portion.

4. The method according to claim 1 further comprising exciting the first piezoelectric element in several frequency ranges, including at least one frequency range between 10 kHz and 200 kHz, simultaneously or successively, depending on the result of the step of determining frequencies of the resonance and dynamic coupling during the design phase.

5. The method according to claim 1, wherein the first piezoelectric element is excited intermittently, either with a timing or from a measurement of the variation in impedance of the first piezoelectric element.

6. The method according to claim 1, wherein:
the first piezoelectric element and the second piezoelectric element comprise a first set of piezoelectric elements;
at least another set of piezoelectric elements is provided at the aircraft portion; and
the excitation of the first set of piezoelectric elements is switched to the other set piezoelectric elements depending on a frost thickness to inhibit de-icing areas where the frost thickness is less than a thickness threshold.

7. A system for de-icing or anti-icing an aircraft portion, the system comprising:
at least one piezoelectric element, the at least one piezoelectric element includes a first piezoelectric element configured to be fastened inside an area of the aircraft portion and a second piezoelectric element located in the vicinity of the first piezoelectric element;
an excitation circuit comprising a signal generator, an amplifier, an analyzer to analyze electrical spectrum produced by the first piezoelectric element, a natural frequency detector, a memory comparator and a frequency setpoint generator; and
a control box electrical coupled to the excitation circuit and configured to:
excite the first piezoelectric element according to natural frequencies of the area of the aircraft portion during the de-icing or anti-icing of the aircraft portion;
determine that the de-icing is operational when an electrical level detected by the second piezoelectric element is within a defined range of an excitation level of the first piezoelectric element; and
excite the second piezoelectric element in addition to the first piezoelectric element in response to the electrical level of the second piezoelectric being outside the defined range of the excitation level of the first piezoelectric element.

8. The system according to claim 7, wherein the excitation circuit comprises a battery or a super capacitor.

9. The system according to claim 7, wherein the excitation circuit comprises means for matching impedance with the impedance of the first piezoelectric element.

10. The system according to claim 7 comprising the first piezoelectric element and the second piezoelectric element, and the excitation circuit is configured to multiplex power and monitor the first piezoelectric element and the second piezoelectric element.

* * * * *